United States Patent [19]

Hemens

[11] 3,847,034
[45] Nov. 12, 1974

[54] CONTROL DEVICES
[75] Inventor: James Frederick Hemens, Billericay, England
[73] Assignee: Teleflex Limited, Essex, England
[22] Filed: Apr. 30, 1973
[21] Appl. No.: 355,913

[30] Foreign Application Priority Data
Nov. 20, 1972 Great Britain .................... 53606/72

[52] U.S. Cl. .................... 74/491, 74/107, 74/501 R, 74/567, 92/13
[51] Int. Cl. ............................................. G05g 1/04
[58] Field of Search ............. 74/491, 501, 89, 99 R, 74/107, 55, 567, 473 R; 180/20; 417/269

[56] References Cited
UNITED STATES PATENTS
2,910,056   10/1959   Sampietro ...................... 417/269 X
3,566,712   3/1971   Houk .................................. 74/491
3,739,656   6/1973   Williams et al. .................. 74/473 R Primary Examiner—Samuel Scott
Assistant Examiner—F. D. Shoemaker

[57]   ABSTRACT

A non-linear control device responds to cable core movement of a push-pull cable to control a pump through the rotation of a pump control shaft. A flange member, which is mounted on the pump housing, has a cam plate pivotally mounted thereon for movement about an axis parallel with the control shaft. The cam plate has an arcuate cam slot provided therein. A radially extending shaft lever of the control shaft has a bearing cam follower at its extended end which is operatively disposed within the cam slot. The cable core is attached to the cam plate at a point remote from the axis to cause the cam plate to move in response thereto.

5 Claims, 5 Drawing Figures

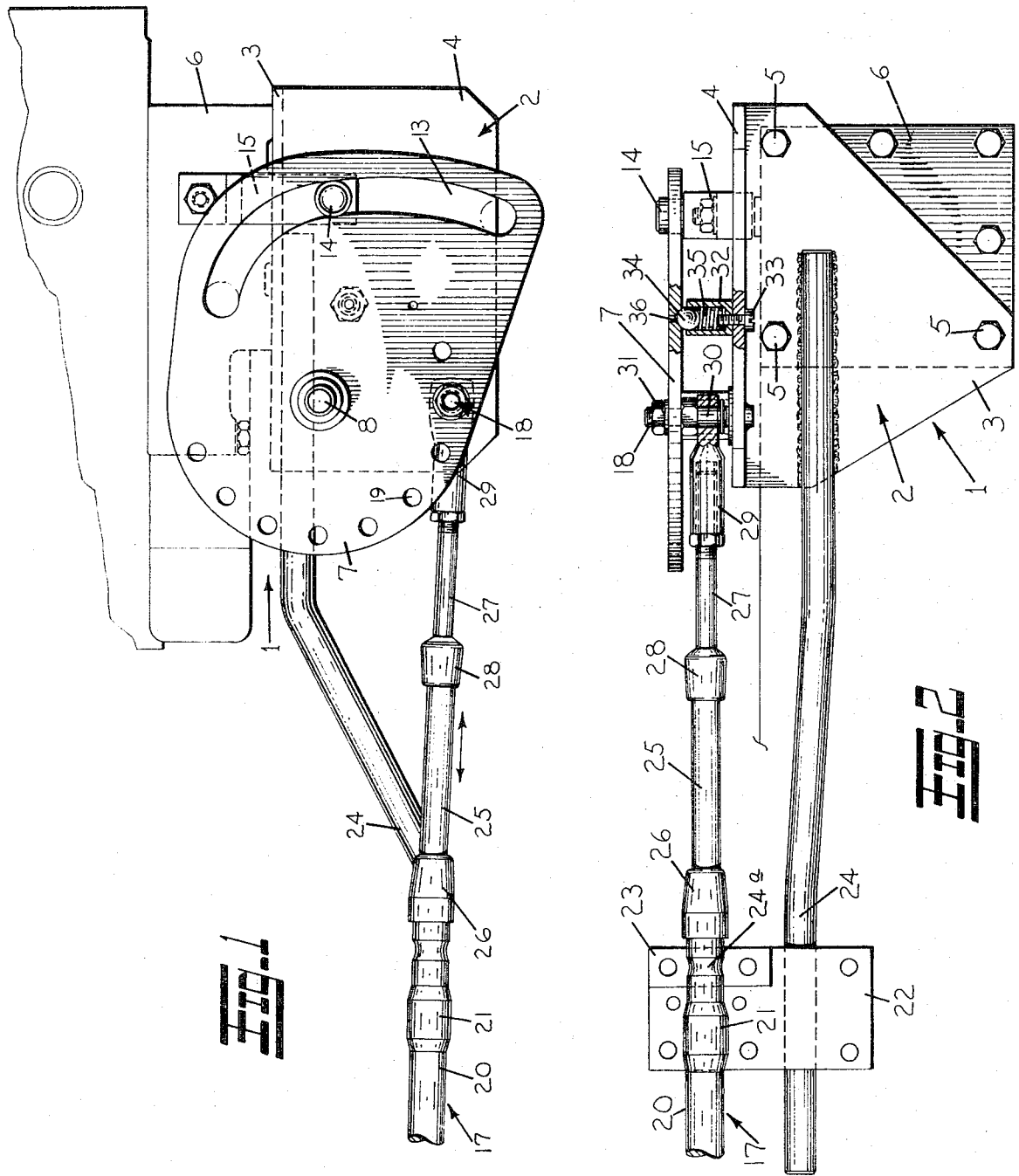

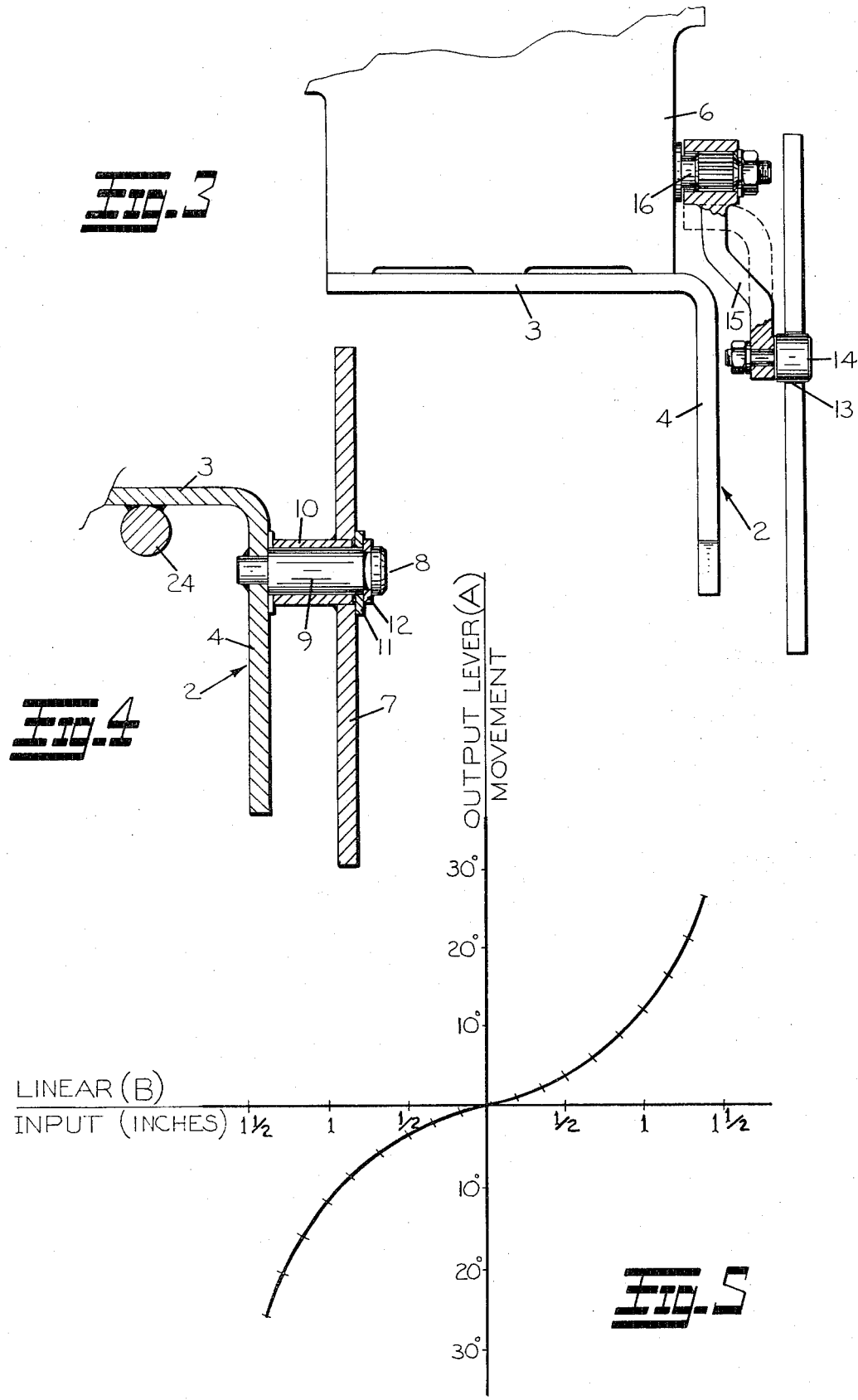

CONTROL DEVICES

This invention relates to control devices, and provides a control device which induces movement of one working element as a non-linear function of the movement of another working element. A control device, thus constructed, is hereinafter termed a non-linear control device. Such a non-linear control device is particularly suitable for actuating a hydrostatic transmission, and, for convenience, the invention will be described in that context.

The various features and advantages of the invention will appear from the following description of one embodiment thereof, given by way of example only, reference being had to the accompanying drawing, in which:

FIG. 1 is a side elevation of a non-linear control device mounted on the variable displacement pump of a pump-variable, fixed displacement motor transmission system and operatively connected to a motion transmitting device of the push-pull cable variety;

FIG. 2 is an underplan partially sectioned view of the assembly depicted in FIG. 1;

FIGS. 3 and 4 illustrate details of the same assembly; and

FIG. 5 is a graphic representation of the movement effected in the shift lever of the same variable displacement pump in respect of movement of the same push-pull cable.

The non-linear control device is generally denoted by reference numeral 1 and has an angle section plate 2 of which one flange 3 is bolted at 5 to the variable displacement pump 6 of the pump-variable, fixed displacement motor transmission system and of which the other flange 4 extends at right angles away from the mounting face of that pump.

A cam plate 7 of the control device 1 extends parallel to the plate flange 4 and is rotatably mounted thereto for swivel movement about an axis 8. Referring particularly to FIG. 4, such rotatable connection comprises a pin 9 affixed to the plate flange 4 and on which is rotatably mounted a sleeve 10 affixed to the cam plate 7 (and serving to space the cam plate from the plate flange), a washer 11 and circlip 12 preventing withdrawal of the sleeve 10 from the pin 9.

An arcuate cam slot 13 is provided through the cam plate 7 the edge of which adjacent that slot is contoured to conform to the configuration thereof. Within the slot 13 (as shown particularly in FIGS. 1 and 3) runs a needle bearing cam follower 14 mounted to one end of the shift lever 15 of the pump 6, such lever 15 being splined and bolted to an input shaft 16 of the pump.

The push-pull cable, generally denoted by reference numeral 17, is affixed at 18 selectively to any of a series of apertures 19 in the cam plate 7, such apertures being arranged around an arc having the axis 8 as its centre. The edge of the cam plate 7 adjacent those apertures 19 is contoured to conform to the arcuate formation thereof. The reason for having a number of apertures 19 is to accommodate for different cable approach angles.

The push-pull cable 17 may be of any conventional construction in which a core slidably reciprocates within a casing 20 to transmit mechanical motion by the application of either tensile or compressive forces to the core when at least the ends of the casing are clamped in a position fixed with respect to the core. In this exemplary cable 17, the casing 20 is formed of a plurality of casing wires laid contiguously, in the form of a long pitched helical coil, about the circumferential surface of an inner flexible plastics tube (in which the core slides), and an outer cover which encases such coil of wires up to and within a short distance from the ends thereof.

A fitting 21 is positioned over the end of the cable casing 20 and is cold-swaged, or otherwise suitably connected, on to the exposed portion of the coil of wires. The end fitting 21 is secured to a plate 22 by a clamp 23. The plate 22 is affixed to a stabilizing bar 24 in turn also affixed to the angle section plate 2. In the exemplary construction depicted, the clamp 23 is provided with a dimple 24a that interfits with an annular recess in the end fitting 21 to assure a fixed location for the end of the cable casing 20 with respect to its own axis.

An extension tube 25 is mounted on the end fitting 21, as by means of a modified ball and socket arrangement (not shown), and such a gyration mounting is preferably protected by a resilient sealing sleeve 26. An end rod 27, which is secured to the cable core in a well known fashion so as to become, in effect, an extension thereof, is closely received within the extension tube 25. A resilient sealing sleeve 28 is provided where the rod 27 enters the tube 25. The end of the rod 27 is secured to a ferrule 29 mounted about a pin 30 bolted at 31 to the cam plate 7.

By means of the described and illustrated construction of the cam plate 7, an input linear movement of the cable 17 will pivot the plate about the axis 8 and so displace the cam slot 13 as to cause the shift lever 15 to rotate the pump input shaft 16a through an angle which is a non-linear function of the linear movement of the cable (as represented in FIG. 5).

The described non-linear control device 1 is particularly intended to stroke said transmission system used on vehicles with a high horse power to weight ratio, such as road-rolling vehicles which need a smooth acceleration from the centre position of the shift lever to either forward or reverse rather than an abrupt lunge from a standstill position, and its construction affords such smooth acceleration.

Another feature of the control device 1 is that it has a 'no-feedback' centre position which permits the vehicle to be unattended while in idle without the possibility of feed-back pressure from the transmission moving the shift lever out of the centre position. One means of achieving this facility is obtained by means of a ball catch type detent shown particularly in FIG. 2 in which a seat 32 is affixed by a screw 33 to the plate flange 4 and locates a ball 34 biased by a spring 35 into a groove 36 in the cam plate 7.

I claim:

1. A non-linear control device responding to movement of a cable core of a push-pull cable to control a pump means through rotation of a control shaft of said pump means comprising:

a flange member fixedly attached to a housing of said pump means;

a cam plate rotatably attached to said flange member for pivotal movement thereon about an axis which is parallel with said control shaft;

said cam plate having a arcuate cam slot provided therein;

said control shaft having a radially extending shaft lever with a bearing cam follower mounted on the extended end thereof;

said bearing cam follower being operatively disposed within said cam slot; and said cable core being attached to said cam plate at a point remote from said axis.

2. A non-linear control device in accordance with claim 1 in which said cam plate extends parallel to said flange member, said arcuate cam slot contoured to conform to the edge of said cam plate.

3. A non-linear control device in accordance with claim 2 in which said pump is a variable displacement pump of a pump-variable, fixed displacement motor transmission system, said cam plate being provided with a series of apertures arranged around an arc equidistant from the center point of rotation of the rotatable attachment of said cam plate to said flange member.

4. A non-linear control device in accordance with claim 3, said push-pull cable being provided with an end fitting fixedly attached to the conduit of said push-pull cable, a stabilizing bar fixedly attached to the flange member, said push-pull cable being attached to said stabilizing bar at said end fitting by means of a plate member.

5. A non-linear control device in accordance with claim 4, a seat means fixedly attached to said flange member providing a seat for a spring-biased ball which selectively registers with a detent provided on the inner face of said cam plate.

* * * * *